(12) United States Patent
Hayakawa

(10) Patent No.: US 10,194,040 B2
(45) Date of Patent: Jan. 29, 2019

(54) APPARATUS, METHOD AND STORAGE MEDIUM THAT STORES PROGRAM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/806,740

(22) Filed: Nov. 8, 2017

(65) Prior Publication Data

US 2018/0069974 A1   Mar. 8, 2018

Related U.S. Application Data

(63) Continuation of application No. 15/273,023, filed on Sep. 22, 2016, now Pat. No. 9,883,060, which is a (Continued)

(30) Foreign Application Priority Data

Sep. 18, 2013   (JP) .................................. 2013-193487

(51) Int. Cl.
*G06F 3/12*   (2006.01)
*H04N 1/00*   (2006.01)

(52) U.S. Cl.
CPC ....... *H04N 1/00477* (2013.01); *H04N 1/0048* (2013.01); *H04N 1/00448* (2013.01);
(Continued)

(58) Field of Classification Search
CPC ........... H04N 1/00477; H04N 1/00448; H04N 1/00472; H04N 1/0048; H04N 1/00506; H04N 2201/0094
(Continued)

(56) References Cited

U.S. PATENT DOCUMENTS 7,593,122 B2   9/2009   Watanabe et al.
7,869,074 B2   1/2011   Uno
(Continued)

FOREIGN PATENT DOCUMENTS

JP   200391423 A   3/2003
WO   2012101863 A1   8/2012

OTHER PUBLICATIONS

Mar. 13, 2017 Office Action issued in Japanese Appln. 2013193487.

*Primary Examiner* — Neil R McLean
(74) *Attorney, Agent, or Firm* — Venable LLP

(57) ABSTRACT

In an apparatus, a reception unit receives information indicating an end of image process in an external apparatus or information indicating an occurrence of an error in the external apparatus. A display control unit causes a display unit to display predetermined information based on the information received by the reception unit. An acquisition unit acquires a constraint condition for causing the display unit to limit a display of the predetermined information. A determination unit determines whether an operating state of an apparatus capable of controlling the display unit meets the constraint condition. When the determination unit determines that the operating state meets the constraint condition, the display control unit limits the display of the predetermined information on the display unit based on the information received by the reception unit.

32 Claims, 14 Drawing Sheets

Related U.S. Application Data continuation of application No. 14/477,462, filed on Sep. 4, 2014, now abandoned.

(52) U.S. Cl.
CPC ..... *H04N 1/00472* (2013.01); *H04N 1/00506* (2013.01); *H04N 2201/0094* (2013.01)

(58) Field of Classification Search
USPC ........................................................ 358/1.13
See application file for complete search history.

(56) References Cited

U.S. PATENT DOCUMENTS

| | | | |
|---|---|---|---|
| 2003/0074496 A1 | 4/2003 | Takahashi et al. | |
| 2003/0174359 A1* | 9/2003 | Gomi .................... | G06F 3/1261 358/1.15 |
| 2004/0183824 A1* | 9/2004 | Benson .................. | G06F 9/451 715/767 |
| 2006/0262349 A1 | 11/2006 | Moroi | |
| 2007/0016867 A1 | 1/2007 | Nickell et al. | |
| 2011/0242592 A1* | 10/2011 | Tamura .............. | H04N 1/00204 358/1.15 |
| 2011/0289504 A1 | 11/2011 | Murasawa | |
| 2012/0314241 A1 | 12/2012 | Uchikawa | |
| 2013/0174359 A1 | 9/2013 | Gomi | |
| 2014/0111823 A1 | 4/2014 | Park et al. | |
| 2015/0169390 A1 | 6/2015 | Hayakawa | |

* cited by examiner

F I G. 2
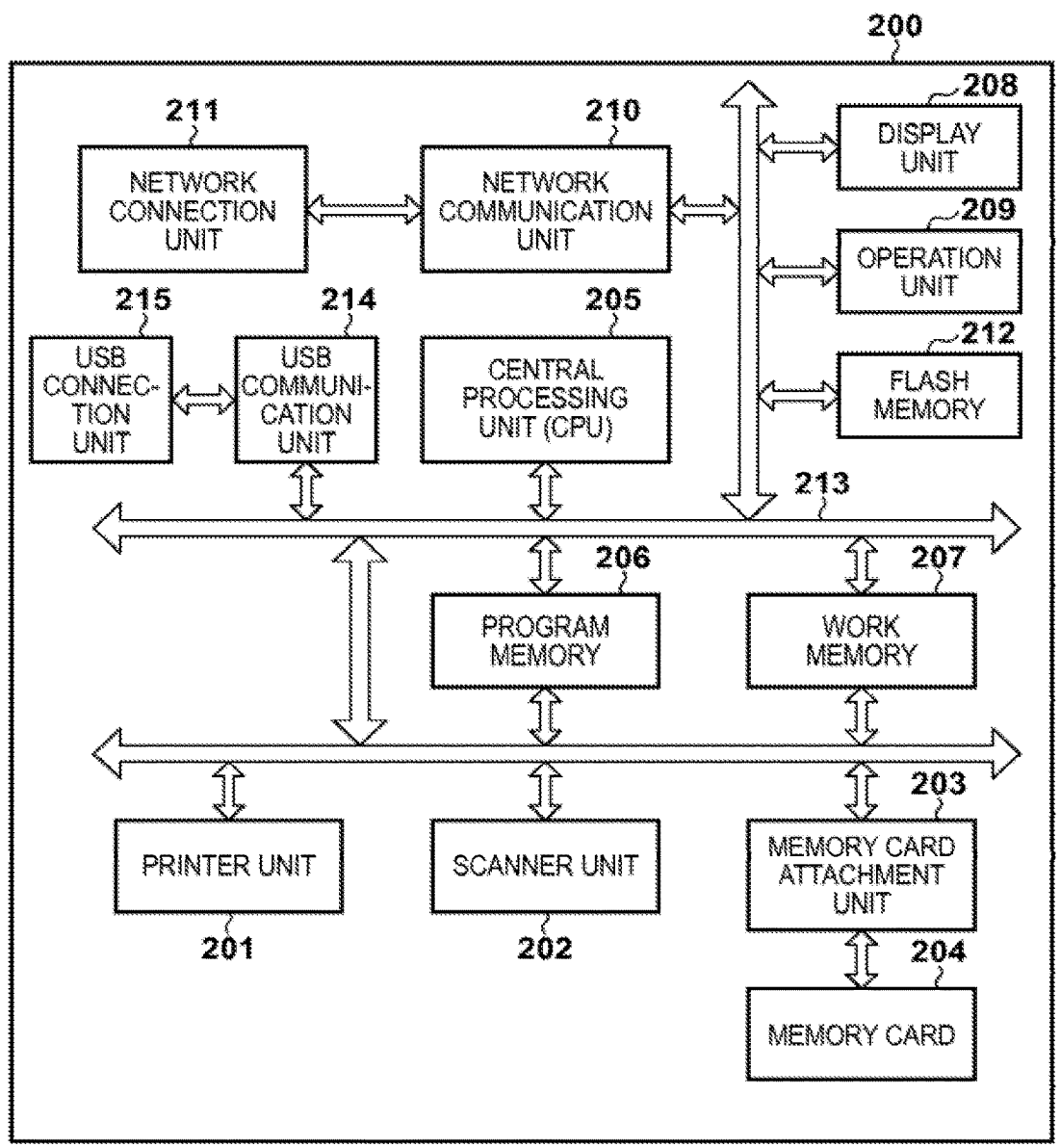

APPARATUS, METHOD AND STORAGE MEDIUM THAT STORES PROGRAM

CROSS-REFERENCE TO RELATED APPLICATION

This application is a continuation of U.S. patent application Ser. No. 15/273,023, filed Sep. 22, 2016, itself a continuation of U.S. patent application Ser. No. 14/477,462, filed Sep. 4, 2014, which claims priority to Japanese Patent Application No. 2013-193487, filed Sep. 18, 2013, which are all herein incorporated by reference.

BACKGROUND OF THE INVENTION

Field of the Invention

The present invention relates to an apparatus that performs display in a plurality of display modes, a method and a storage medium that stores a program.

Description of the Related Art

As is conventionally known, an information processing apparatus operates while switching the display mode when executing an OS or an application. Japanese Patent Laid-Open No. 2003-91423 describes causing a plurality of users to switch desktop display on one information processing apparatus.

When a user watches a game, a DVD, or the like, the display mode is switched to a full screen mode not to display any other windows. In this state, since applications other than that operating in the full screen mode cannot separately be activated, the user can concentrate on a work or watching. A multiwindow mode assumes that the user operates the display by a pointing device, and its convenience is lost in a touch operation where the user operates the display by a finger or a stylus. For this reason, an application developed assuming the touch operation is executed by switching the display to a single window environment.

On the other hand, a system is known in which an image reading apparatus and an information processing apparatus cooperatively perform image reading processing. In this system, the user inputs a read instruction by operating the operation panel of the image reading apparatus. The image reading apparatus transfers read image data to the information processing apparatus. The information processing apparatus transfers the image data to a cooperative application.

In some cases, however, image data transferred from the image reading apparatus during a work in the full screen mode or single window mode is transferred to an application that should be executed in the multiwindow mode. In that case, although the work is progressing in the full screen mode or single window mode, the display mode is switched to the multiwindow mode to display another window. As a result, user's working efficiency on the application lowers.

SUMMARY OF THE INVENTION

An aspect of the present invention is to provide an apparatus for eliminating the above-mentioned problems, a method and a storage medium that stores a program. And an aspect of the present invention provides an information processing apparatus for preventing user's working efficiency from lowering, a display control method and a storage medium that stores a program.

The present invention in one aspect provides an apparatus comprising: a reception unit configured to receive information indicating an end of image process in an external apparatus or information indicating an occurrence of an error in the external apparatus; a display control unit configured to cause a display unit to display predetermined information based on the information received by the reception unit; an acquisition unit configured to acquire a constraint condition for causing the display unit to limit a display of the predetermined information; and a determination unit configured to determine whether an operating state of an apparatus capable of controlling the display unit meets the constraint condition acquired by the acquisition unit, wherein in a case where the determination unit determines that the operating state meets the constraint condition, the display control unit limits the display of the predetermined information on the display unit based on the information received by the reception unit.

Further features of the present invention will become apparent from the following description of exemplary embodiments with reference to the attached drawings.

BRIEF DESCRIPTION OF THE DRAWINGS

FIG. 2 is a block diagram showing the arrangement of an image reading apparatus;

DESCRIPTION OF THE EMBODIMENTS

Figure 1:
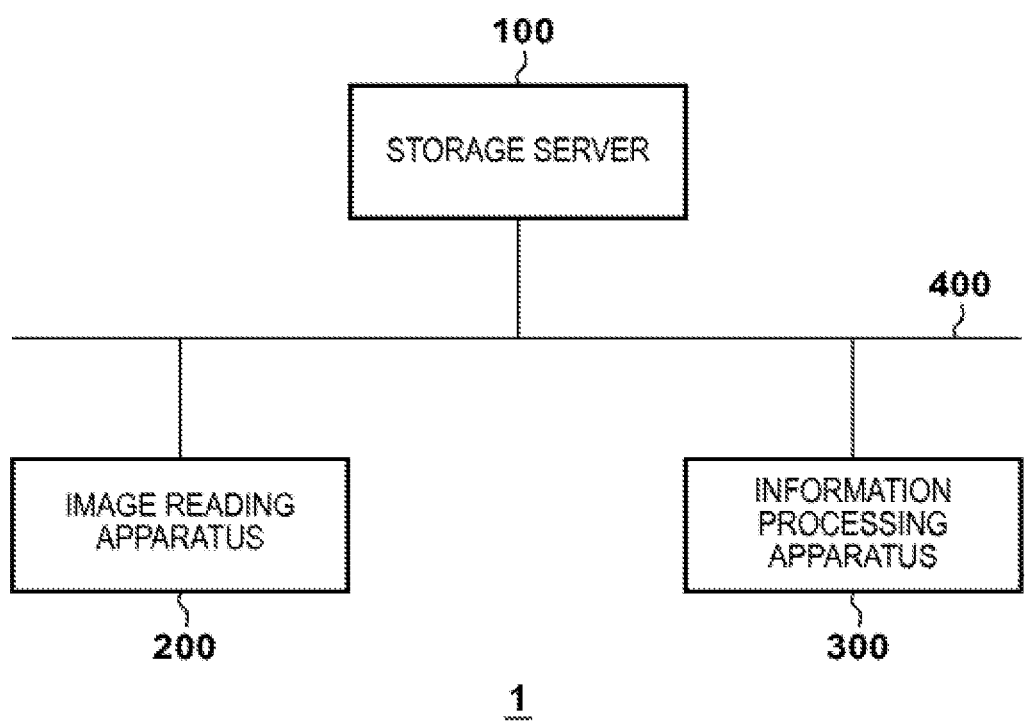
FIG. 1 is a block diagram showing an arrangement of an image reading system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

In reading processing according to this embodiment, an image reading apparatus transfers image data generated by reading an image to a storage server on a network. An information processing apparatus acquires the image data from the storage server and transfers the acquired image data to a cooperative application.

FIG. 1 is a block diagram showing an arrangement of an image reading system according to this embodiment. A system 1 includes a storage server 100, an image reading apparatus 200, and an information processing apparatus 300. The apparatuses are communicably connected to each other via a network 400. The image reading apparatus 200 transmits image data acquired by optically reading an image to the storage server 100. The information processing apparatus 300 acquires the image data from the storage server 100 using a URL representing the location of the image data.

FIG. 2 is a block diagram showing the arrangement of the image reading apparatus 200. The image reading apparatus 200 is not particularly limited as long as it can read an image. In this embodiment, the image reading apparatus 200 is assumed to be an MFP (MultiFunctional Peripheral) that integrates a plurality of functions. The image reading apparatus 200 includes a printer function and a scanner function and can provide a service based on each function to an external apparatus via the network 400. In the image reading apparatus 200, the printer function is implemented by a printer unit 201, and the scanner function is implemented by a scanner unit 202. The printer unit 201 prints externally received image data, image data stored in a memory card 204 attached to a memory card attachment unit 203, or the like on a printing medium by an inkjet printing method, an electrophotographic printing method, or the like. The scanner unit 202 converts image data acquired by optically reading an original set on a platen glass into data of a specific file format and transmits it to an external apparatus such as the storage server 100 via the network 400.

A CPU 205 generally controls the entire image reading apparatus 200. A program memory 206 stores, for example, a control program used by the CPU 205 to implement an operation according to the embodiment. A work memory 207 temporarily stores or buffers image data or the like when executing each service. A display unit 208 includes a display such as an LCD and displays the state of the image reading apparatus 200, a setting screen, or the like by a user interface screen. An operation unit 209 includes hardware keys and accepts an instruction from the user.

A network communication unit 210 connects the image reading apparatus 200 to the network 400 and enables communication with an external apparatus. A network connection unit 211 connects the network communication unit 210 to a medium such as a cable that constitutes the network 400. The network connection unit 211 can support a wired LAN or a wireless LAN. When supporting a wired LAN, the network connection unit 211 is a connector configured to connect a wired LAN cable to the image reading apparatus 200. When supporting a wireless LAN, the network connection unit 211 is an antenna.

A flash memory 212 stores, for example, the transmission source information of packet data that the network communication unit 210 has received from an external apparatus. A USB communication unit 214 enables the image reading apparatus 200 to communicate with the external apparatus via a USB (Universal Serial Bus) interface. A USB connection unit 215 is a USB connector configured to connect the external apparatus. The units shown in FIG. 2, except the memory card 204, the network connection unit 211, and the USB connection unit 215, are communicably connected to each other via a system bus 213.

Figure 3:
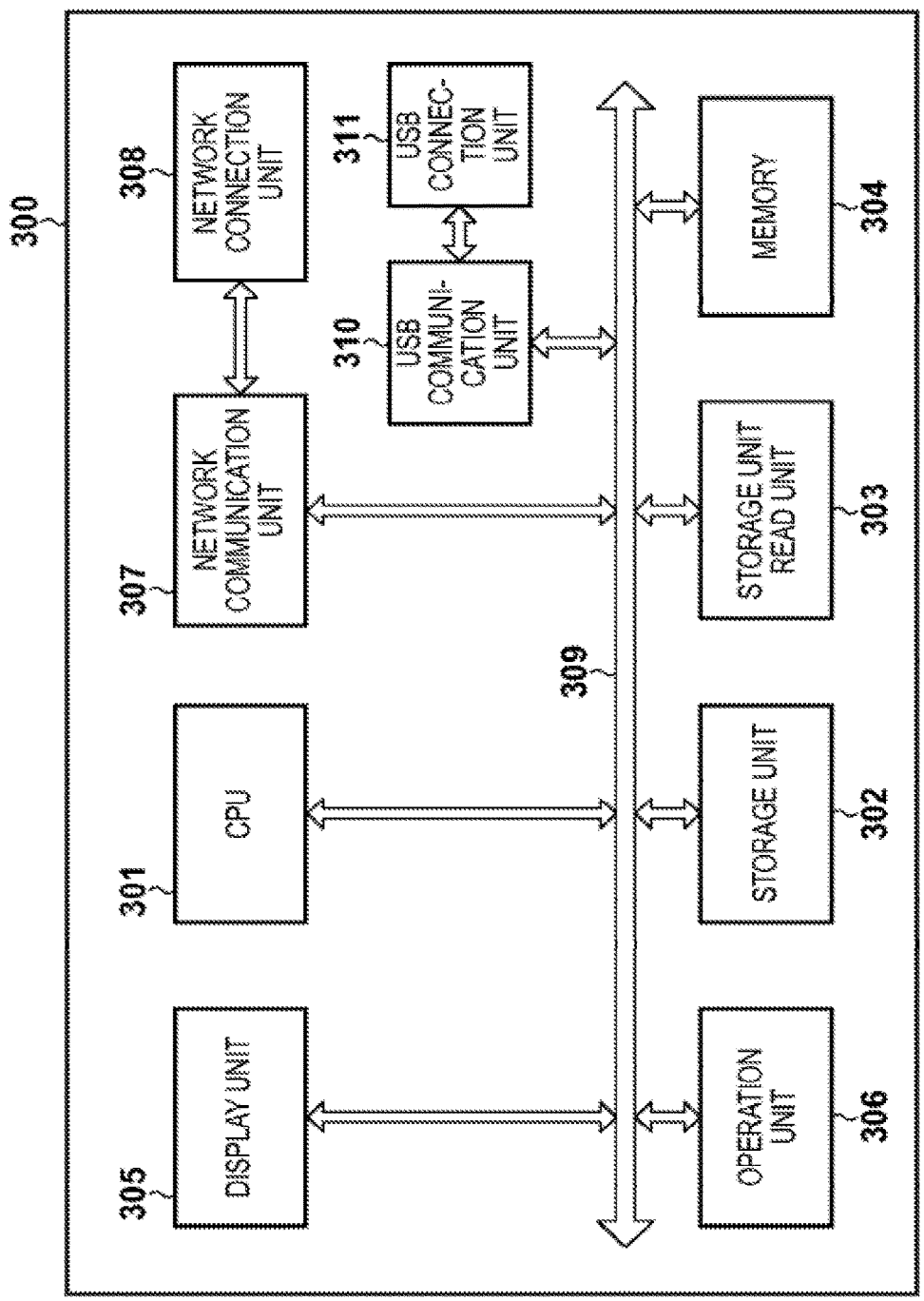
FIG. 3 is a block diagram showing the arrangement of an information processing apparatus.

FIG. 3 is a block diagram showing the arrangement of the information processing apparatus 300. The information processing apparatus 300 is, for example, an information processing apparatus on which a predetermined application can operate. In this embodiment, the information processing apparatus 300 is assumed to be a general PC. A CPU 301 generally controls the entire information processing apparatus 300. A storage unit 302 is, for example, a CD-ROM and stores, for example, an OS and various applications configured to execute the following processing. A storage unit read unit 303 reads out data stored in the storage unit 302. A memory 304 temporarily stores or buffers various data such as image data when the CPU 301 executes a program.

A display unit 305 includes a display such as an LCD and displays the state of the information processing apparatus 300, a setting screen, or the like by a user interface screen. Display can be done in the display area of the display unit 305 in a plurality of display modes such as a full screen mode and a single window mode. An operation unit 306 includes a keyboard and a pointing device and can accept an instruction from the user.

A network communication unit 307 connects the information processing apparatus 300 to the network 400 and enables communication with an external apparatus. A network connection unit 308 connects the network communication unit 307 to a medium such as a cable that constitutes the network 400. Like the network connection unit 211 described with reference to FIG. 2, the network connection unit 308 can support a wired LAN or a wireless LAN. A USB communication unit 310 enables the information processing apparatus 300 to communicate with the external apparatus via a USB (Universal Serial Bus) interface. A USB connection unit 311 is a USB connector configured to connect the external apparatus. The units shown in FIG. 3, except the network connection unit 308 and the USB connection unit 311, are communicably connected to each other via a system bus 309.

Figure 4:
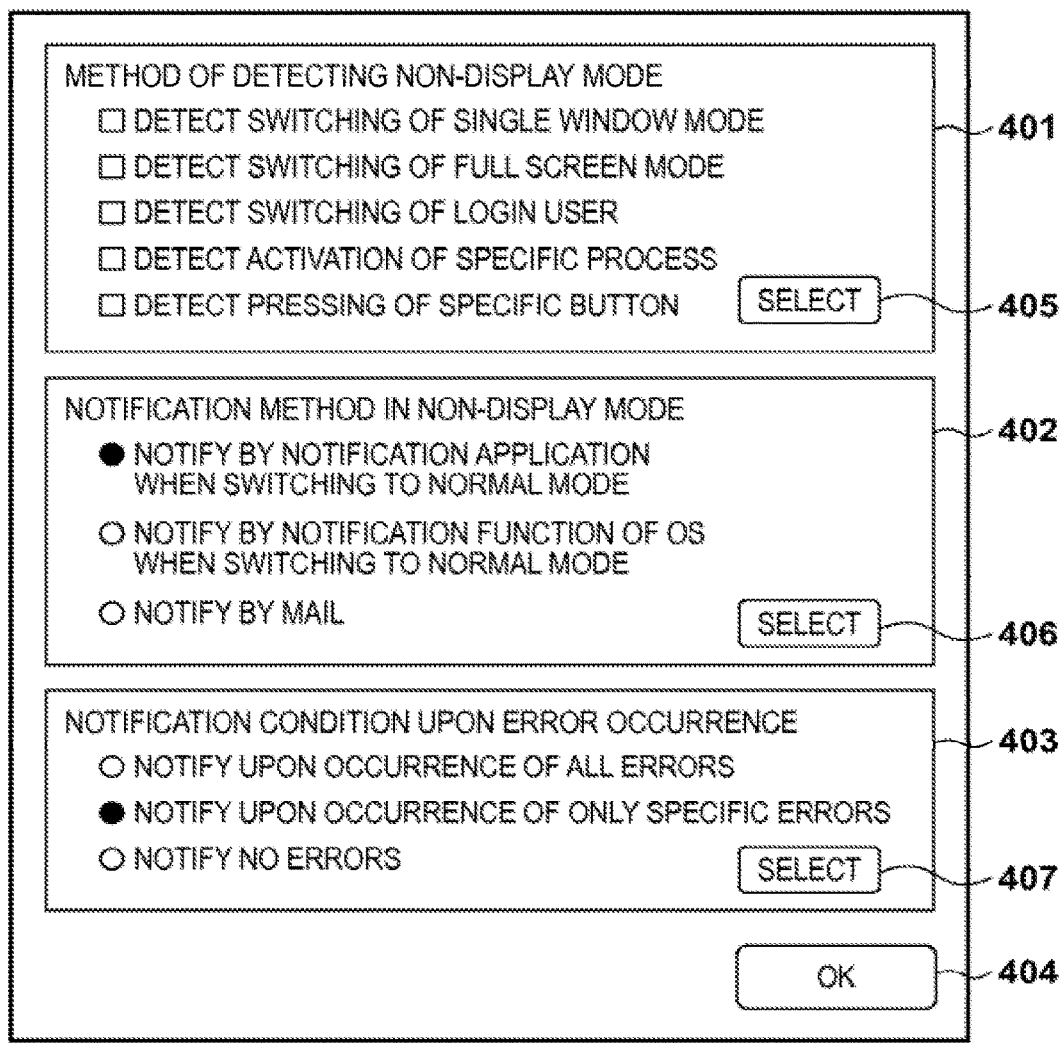
FIG. 4 is a view showing a screen configured to set notification conditions to a user.

FIG. 4 is a view showing a user interface screen configured to set notification conditions (display conditions) to the user concerning a result of executing reading processing. In this embodiment, the user can set the notification conditions to him/her by the setting screen shown in FIG. 4 before execution of reading processing. The screen shown in FIG. 4 can be displayed on either the display unit 208 of the image reading apparatus 200 or the display unit 305 of the information processing apparatus 300.

In this embodiment, the notification condition setting screen includes a setting UI 401 that sets a method of detecting a non-display mode, a setting UI 402 that sets a method of notifying that the non-display mode is being set, a setting UI 403 that sets a notification condition at the time of error occurrence, and an OK button 404. Selection of a timing of notification to the user can be accepted by selecting a method of detecting the non-display mode in the setting UI 401 (an example of a setting means). In other words, it is possible to accept, from the user, mode selection as an example of a constraint condition used to prohibit display of a reading processing result from the image reading apparatus 200 at the end of reading processing. For example, when the user selects the check box "detect switching of single window mode", it is determined during the single window mode that the display mode is the non-display mode, and the user is not notified of the reading processing result. At the timing of change from the single window mode to another mode, for example, at the timing of switching to the multiwindow mode, the user is notified of the reading processing result. That is, display of the reading processing result is not permitted during display in the single window mode. In this case, the reading processing result includes, for example, success of image data acquisition or error occurrence in the image reading apparatus 200.

When the user selects the check box "detect switching of full screen mode", it is determined during the full screen mode that the display mode is the non-display mode, and the user is not notified of the reading processing result. At the timing of change from the full screen mode to another mode, for example, the multiwindow mode, the user is notified of the reading processing result. That is, display of the reading processing result is not permitted during display in the full screen mode.

Both the single window mode and the full screen mode are display modes in which a display target screen is maximized and displayed in the display area of the display. Display of the reading processing result in the display area can be prohibited by selecting the check box "detect switching of single window mode" or "detect switching of full screen mode" in the setting UI 401. That is, a setting can be done to prohibit interrupt display in the display area even when the reading processing result is received from the image reading apparatus 200 during display in the display mode such as the single window mode or full screen mode in which the screen is maximized and displayed in the display area of the display.

When the user selects (checks) the check box "detect switching of login user", it is determined until switching of the login user that the display mode is the non-display mode, and the user is not notified of the reading processing result. At the timing of detecting switching of the login user, the user is notified of the reading processing result. More specifically, in a case where a plurality of user accounts have logged in on one OS, the user who performs reading processing is notified of the reading processing result at the timing of switching his/her login session from background to foreground.

When the user selects the check box "detect activation of specific process", it is determined during activation of a specific process that the display mode is the non-display mode, and the user is not notified of the reading processing result. For example, assume that the user executes reading processing by erroneously pressing the operation button of the image reading apparatus 200 during execution of an application installer or OS maintenance software. In this case, if an application is activated in the information processing apparatus 300 after execution of reading processing, a trouble may occur or execution of the installer or maintenance software may fail. To prevent this failure, when activation of a specific process is detected, the user is not notified of the reading processing result even when the reading processing has ended. In this embodiment, a select button 405 is displayed on the right side of the display of "detect activation of specific process" to enable selection of the specific process. When the select button 405 is pressed, installers and maintenance software are displayed, and selection of the user can be accepted. The user is notified of the reading processing result at the timing of end of the specific process.

When the user selects the check box "detect pressing of specific button", it is determined until pressing of a specific button is detected that the display mode is the non-display mode, and the user is not notified of the reading processing result. For example, assume that the image reading apparatus 200 reads a plurality of originals. Even when the user presses the read button, and reading processing is executed, in some cases, the reading processing is not completed for all originals that the user wants to read. When the user selects the check box "detect pressing of specific button", and the end button of the image reading apparatus 200 is set as the specific button, the user is not notified of the reading processing result in a state before the specific button is pressed. The user is notified of completion of the reading processing at the timing of pressing of the end button of the image reading apparatus 200.

In this embodiment, the single window mode, the full screen mode, the state in which the user who executes reading processing is a background user, the state in which a specific process is activated, or the state until a specific button is pressed is the state in which reading processing result notification (interrupt display) to the user is not permitted. In this sense, these states will generically be referred to as a "non-display mode" hereinafter. A state that is not the non-display mode will be referred to as a "normal node". Note that the setting UI 401 shown in FIG. 4 has been described using the above-described five items as examples. However, the present invention is not limited to this, and the setting UI 401 may include items other than the five items above or fewer items. The user may be able to select a plurality of items in the setting UI 401 shown in FIG. 4.

The setting UI 402 can accept selection of a method of notifying the user of the reading processing result upon returning to the normal mode. For example, when the user selects the radio button "notify by notification application when switching to normal mode", he/she is notified of the reading processing result by a notification application configured to notify the execution result of reading processing. When the user selects the radio button "notify by notification function of OS when switching to normal mode", he/she is notified of the reading processing result by the function of the OS. When the user selects the radio button "notify by mail", he/she is notified of the reading processing result by email to a registered mail address. In this embodiment, a set button 406 is displayed on the right side of the display of "notify by mail". When the set button 406 is pressed, a mail address setting screen (not shown) is displayed to allow the user to register the mail address.

The setting UI 403 can accept selection of a condition to notify error occurrence. For example, when the user selects the radio button "notify upon occurrence of all errors", he/she is notified of all types of errors that have occurred during reading processing. When the user selects the radio button "notify upon occurrence of only specific errors", he/she is notified of only specific types of errors that have occurred during reading processing. In this embodiment, a select button 407 is displayed on the right side of the display of "notify upon occurrence of only specific errors". When the select button 407 is pressed, a list of errors (not shown) that can be notified is displayed to allow the user to select error types. Examples of the specific errors to be notified to the user are paper jam in the ADF, a shortage in the free area of the network storage, and an error that needs to be solved via a user operation. Note that the specific error selection method is not limited to this, and the user may make a choice from options such as "notify errors of high urgency level", "notify errors of medium or higher urgency level", and the like. In this case, urgency levels are preset for the error types. When the user selects the radio button "notify no errors", notification to the user is not performed even when an error has occurred during reading processing. Contents selected by the above-described setting items 401 to 403 are determined by pressing the OK button 404.

Figure 5:
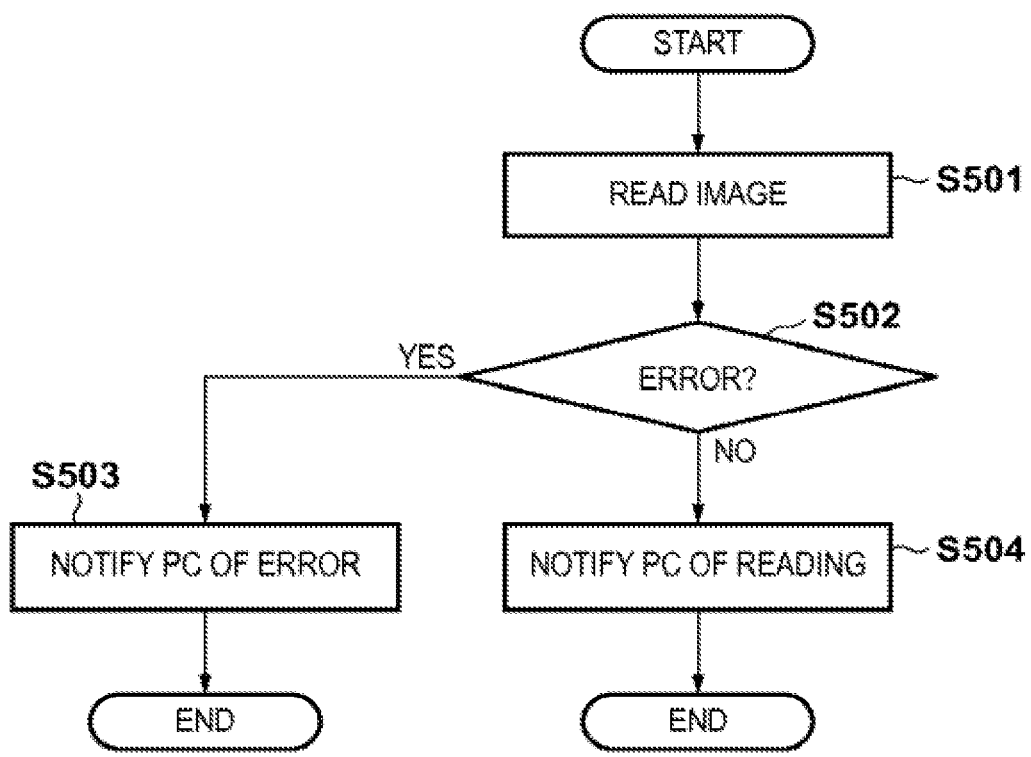
FIG. 5 is a flowchart showing the procedure of reading control processing of the image reading apparatus.

FIG. 5 is a flowchart showing the processing of the notification control method of the image reading apparatus 200. Each processing shown in FIG. 5 is executed by, for example, the CPU 205. First in step S501, the user operates the operation unit 209 of the image reading apparatus 200 and instructs to execute reading processing of an original placed on the platen glass or set on the ADF, thereby executing reading processing of the image of the original. Then, image data generated by the reading processing is transferred to the storage server on the network. In step S502, it is determined whether an error has occurred. Here, the error is, for example, a failure in transferring the image data acquired after the reading processing to the storage server 100. Upon determining in step S502 that the error has occurred, in step S503, the image reading apparatus 200 notifies the information processing apparatus 300 of error information as the reading processing result. On the other hand, upon determining in step S502 that no error has occurred, in step S504, the image reading apparatus 200 notifies the information processing apparatus 300 of URL information representing the storage location of the image data in the storage server 100 as the reading processing result.

Figure 6:
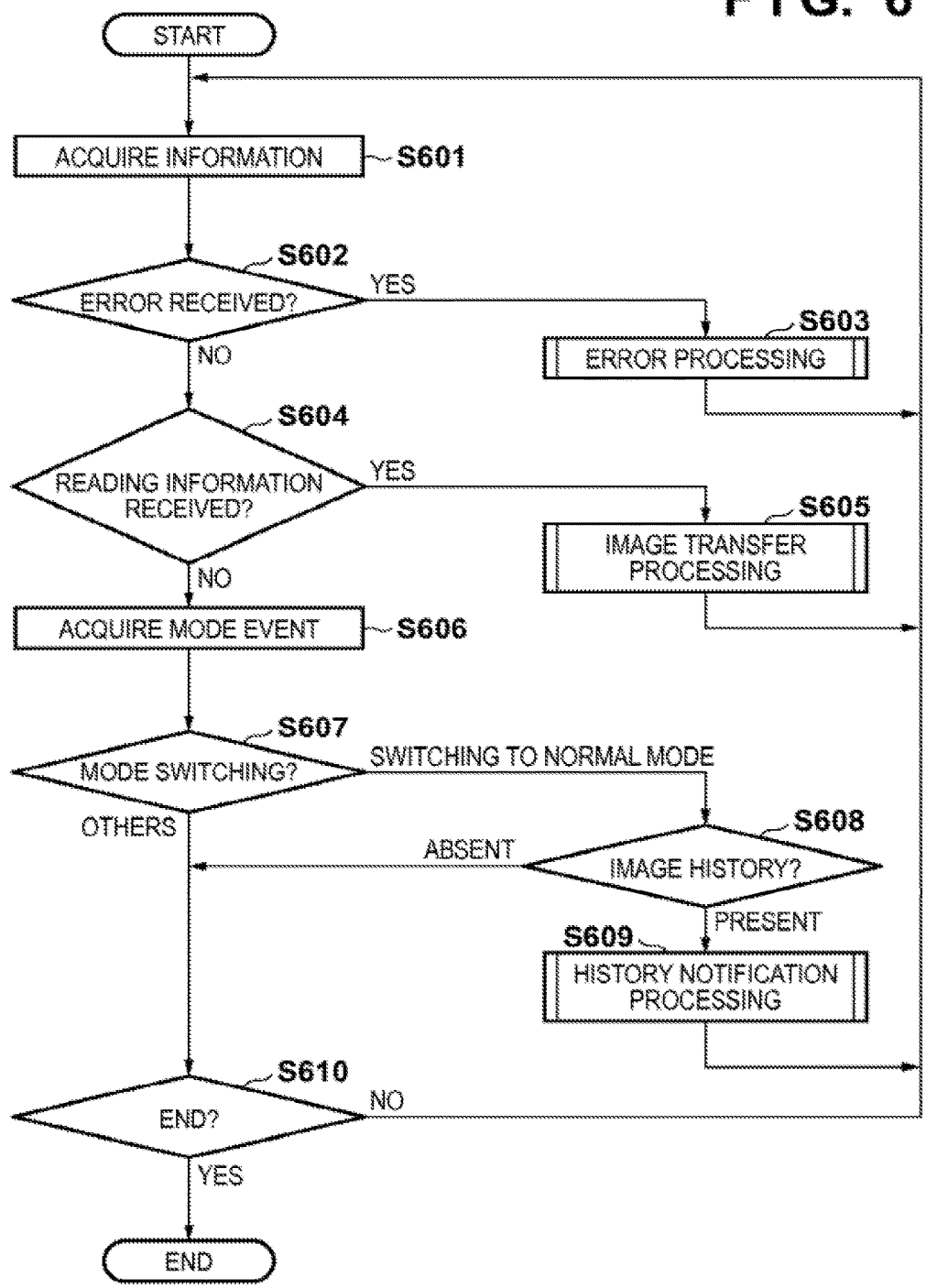
FIG. 6 is a flowchart showing the procedure of notification control processing of the information processing apparatus.

FIG. 6 is a flowchart showing the procedure of display control processing to be performed in the information processing apparatus 300 based on notification information from the image reading apparatus 200. Each processing shown in FIG. 6 is executed by, for example, the CPU 301. The information processing apparatus 300 can receive notification information from the image reading apparatus 200 any time by, for example, a program that is automatically activated at the time of user login.

First in step S601, notification information is received from the image reading apparatus 200. The notification information is, for example, the result of reading processing in the image reading apparatus 200. The notification information may include display instruction information that instructs the display unit of the apparatus that has received the notification information to display the notification information. The processing of step S601 may be done by a polling method of causing the information processing apparatus 300 to periodically request the image reading apparatus 200 to acquire the notification information. Alternatively, the processing may be done by an eventing method of setting a specific port of the information processing apparatus 300 in a Listen state and receiving the notification information from the image reading apparatus 200 by the specific port.

In step S602, it is determined whether an error is received. More specifically, it is determined whether the notification information received in step S601 is the error information notified in step S503 of FIG. 5. The processing of step S602 may be done by, for example, recognizing a specific format of XML. Upon determining that the notification information is the error information, the process advances to step S603 to execute error processing. Upon determining that the notification information is not the error information, the process advances to step S604.

Figure 7:
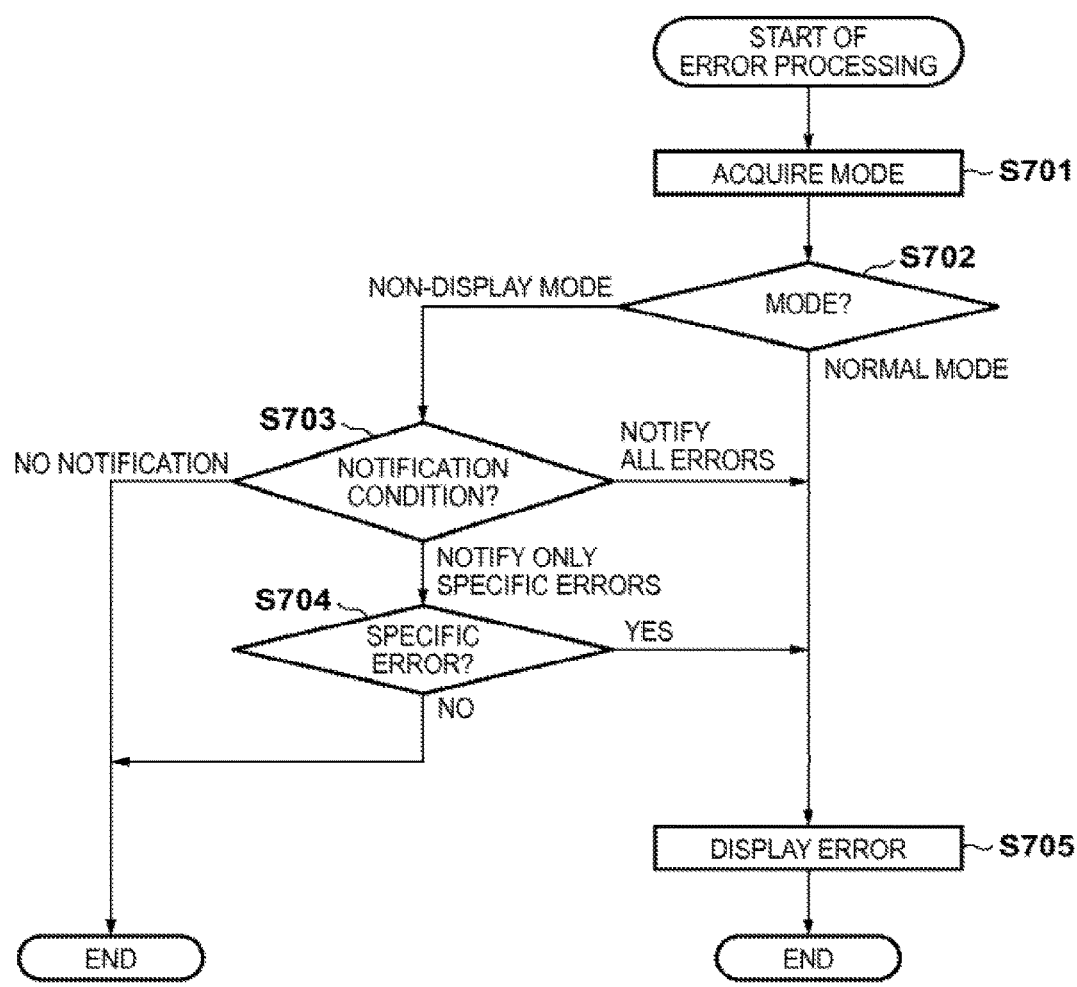
FIG. 7 is a flowchart showing the procedure of processing of step S603 in FIG. 6.

FIG. 7 is a flowchart showing the procedure of error processing of step S603 in FIG. 6. In step S701, the current mode of the information processing apparatus 300 is acquired based on the set contents of the setting item 401 in FIG. 4. For example, information representing whether the information processing apparatus 300 is in the single window mode or full screen mode, whether the user who executes reading processing is a background user, whether a specific process is activated, or whether a specific button of the image reading apparatus 200 is pressed is acquired.

The acquisition method of each mode is not particularly limited. In, for example, Windows8®, the single window mode can be detected using an API IMetroMode::GetMonitorMode( ). The full screen mode can be detected using, for example, an API GetWindowRect. The background user can be detected using, for example, an API WTSQuerySessionInformation( ). Activation of a specific process can be detected using, for example, an API CreateToolhelp32Snapshot. Pressing of a specific button of the image reading apparatus 200 can be detected by, for example, requesting the image reading apparatus 200 to acquire information of a pressed button. Each mode may be detected by the notification information received from the image reading apparatus 200 in step S601.

In step S702, it is determined whether the mode is the non-display mode or the normal mode. In this case, when a plurality of modes are determined, and at least one mode is determined as the non-display mode, the mode is determined as the non-display mode, and the process advances to step S703. On the other hand, when a plurality of modes are determined, and all modes are determined as the normal modes, the mode is determined as the normal mode, and the process advances to step S705. Alternatively, when the setting UI 401 shown in FIG. 4 has no check mark, the mode is determined as the normal mode, and the process advances to step S705. Note that a plurality of modes need not always be determined in step S702. For example, in step S701, only information representing whether the current mode is the non-display mode selected by the setting UI in FIG. 4 is acquired. More specifically, when, for example, the single window mode is selected as the non-display mode, only information representing whether the current mode is the single window mode is acquired. In step S702, it is determined based on the result obtained in step S701 whether the current mode is the non-display mode.

In step S703, the notification condition is determined. In this embodiment, which notification method is selected by the setting UI 403 in FIG. 4 is determined. When "notify upon occurrence of all errors" is selected, the process advances to step S705. When "notify upon occurrence of only specific errors" is selected, the process advances to step S704. When "notify no errors" is selected, the processing shown in FIG. 7 ends without notifying the user of the error regardless of the error occurrence.

In step S704, it is determined whether the contents of the error information acquired in step S602 of FIG. 6 correspond to a specific error. Upon determining that the contents correspond to a specific error, the process advances to step S705. Upon determining that the contents do not correspond to a specific error, the processing shown in FIG. 7 ends.

Figure 10:
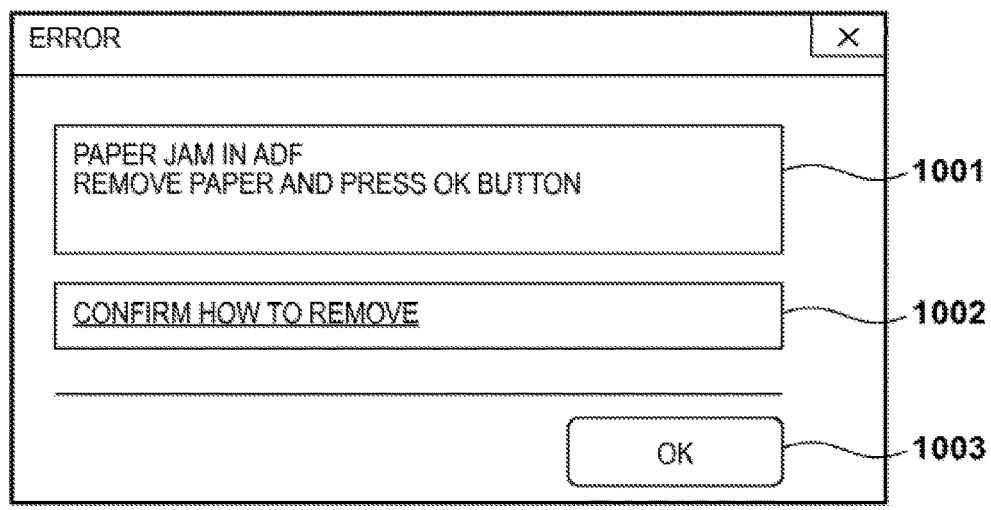
FIG. 10 is a view showing an error display screen.

In step S705, the error information is displayed on the display unit 305 of the information processing apparatus 300. FIG. 10 is a view showing an example of an error display screen. A display 1001 shows an explanation of the error state that has occurred. The user can solve the error by referring to the explanation of the display 1001. If the error cannot be solved by the explanation of the display 1001, the user clicks the hyperlink of a display 1002 to open, on a web browser, the link of a cooperative electronic manual or the link of a manual page on the web, thereby confirming detailed solution procedures. After confirming the error contents by the display 1001 or 1002, the user presses a button 1003, thereby closing the error display screen.

By the above-described error processing, the error notification to the user can be controlled in accordance with the set contents shown in FIG. 4 and the mode of the information processing apparatus 300. For example, assume that "detect switching of single window mode" is selected by the setting item 401 in FIG. 4, and "notify upon occurrence of only specific errors" is selected by the setting item 403. In this case, even when an error other than the specific errors has occurred at the time of image reading during the user's work in the single window mode, he/she is not notified of the error information at that point of time. This allows the user to concentrate on the work in the single window mode. When the single window mode or full screen mode changes to the multiwindow mode, or an error that needs to be solved by the user has occurred, the user is notified of the error information. It is therefore possible to cope with the image reading processing without any problem.

Referring back to FIG. 6, the process returns to step S601 after the processing of step S603 in FIG. 6. In step S604, it is determined whether the notification information received in step S601 is the reading information (URL information) notified in step S504 of FIG. 5. Upon determining that the notification information is the URL information notified in step S504, the process advances to step S605. Upon determining that the notification information is not the URL information notified in step S504, the process advances to step S606.

Figure 8:
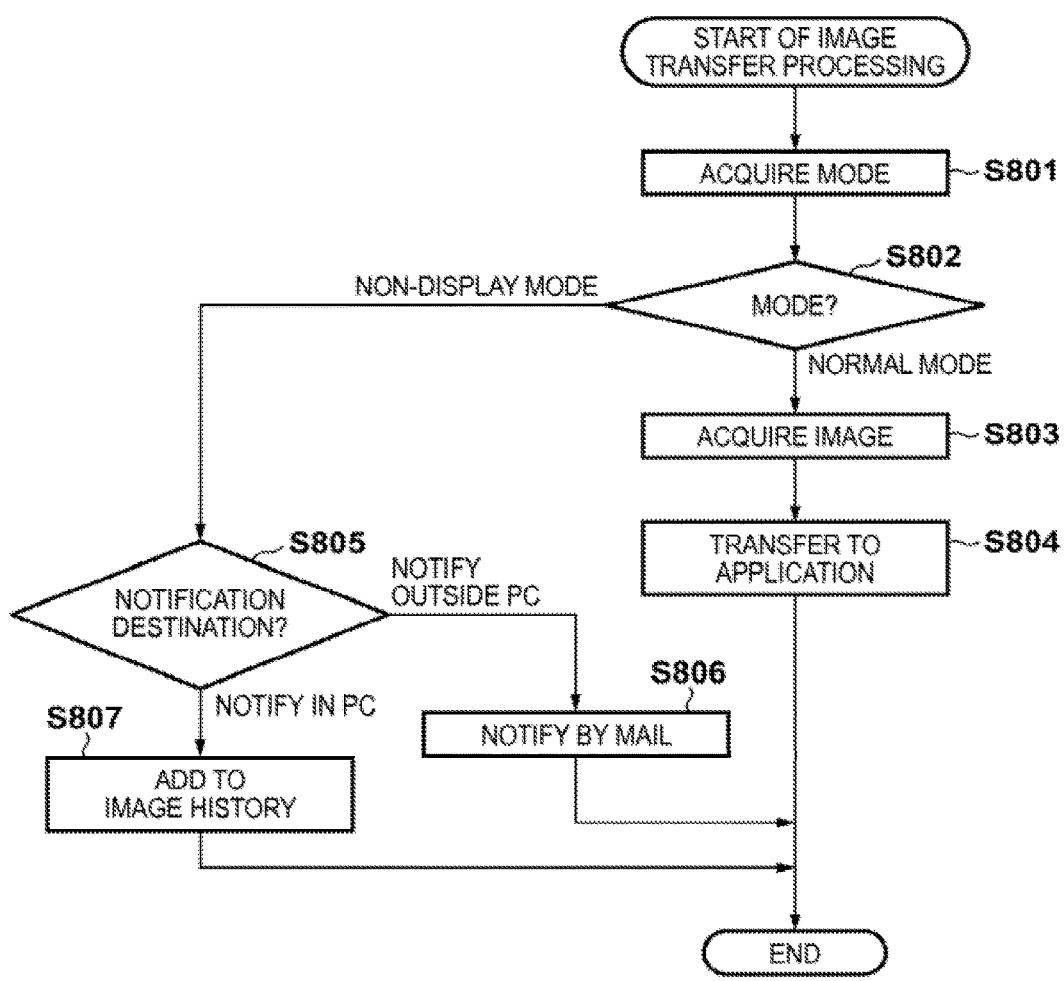
FIG. 8 is a flowchart showing the procedure of processing of step S605 in FIG. 6.

FIG. 8 is a flowchart showing the procedure of image transfer processing of step S605 in FIG. 6. Processes of steps S801 and S802 are the same as those of steps S701 and S702 of FIG. 7, and a description thereof will be omitted. When the mode is determined as the non-display mode in step S802, the process advances to step S805. When the mode is determined as the normal mode, the process advances to step S803. In step S803, the image data is downloaded from the storage server 100 using the URL information notified from the image reading apparatus 200. In step S804, the downloaded image data is transferred to an application cooperative with the reading processing, and the processing of FIG. 8 ends. An example of the application is an application that manages/processes image data read by file management software, form software, or the like.

In step S805, it is determined whether to notify URL information to the user in the information processing apparatus 300 or outside the information processing apparatus 300. Upon determining to notify the URL information to the user in the information processing apparatus 300, the process advances to step S807. Upon determining to notify the URL information outside the information processing apparatus 300, the process advances to step S806. The determination of step S805 is done based on the set contents of the setting UI 402 in FIG. 4. For example, when "notify by notification application when switching to normal mode" or "notify by notification function of OS when switching to normal mode" is selected by the setting UI 402, the notification destination of the error information is the information processing apparatus 300 itself. Hence, in this case, it is determined to notify the user in the information processing apparatus 300. When "notify by mail" is selected, and a mail address is registered, the notification destination of the error information is a mail server that is an external apparatus of the information processing apparatus 300. It is therefore determined to notify outside the information processing apparatus 300.

In step S806, the URL information is transmitted to the mail address registered by the select button 405 in FIG. 4, and the processing of FIG. 8 ends. For example, the user can register the mail address of a smartphone or the like in advance and receive the URL information by the mail address of the smartphone or the like. The image data can be downloaded by the smartphone from the storage server 100 based on the URL information. On the other hand, in step S807, the URL information is notified in the PC and stored in the memory 304 as a read image history, and the processing of FIG. 8 ends.

That is, even when "notify by notification function of OS when switching to normal mode" is selected by the setting UI 402 in FIG. 4, the user is not notified of completion of reading processing at the time of end of the reading processing if the information processing apparatus 300 is in the non-display mode. For example, assume that "detect switching of single window mode" is selected by the setting UI 401, and "notify by mail" is selected by the setting UI 402. In this case, if the user is working in the single window mode, no email is transmitted even when the reading processing is completed. Hence, the user can concentrate on the work in the single window mode. When the mode switches to the multiwindow mode, the user is notified of completion of the reading processing in history notification processing (to be described later), and the image data is acquired and transferred to a cooperative application. It is therefore possible to perform the image reading operation without any problem.

Referring back to FIG. 6, the process returns to step S601 after the processing of step S605 in FIG. 6. In step S606, a mode event is acquired. Here, switching of the mode of the OS (event) is acquired. In the processing of step S606, the same processing as in step S701 or S801 may be performed, and if the acquired mode is different from a mode acquired in the past, it may be determined that a mode switching event is acquired. If the OS is configured to transmit the mode switching event to a predetermined process, the mode switching event may be acquired. For example, in the single window mode, the mode switching event can be acquired using an API IMonitorModeEvents::MonitorModeChanged( ). In the full screen mode, the mode switching event can be acquired by processing a window message WM_SESSION_CHANGE.

In step S607, it is determined based on the mode switching event acquired in step S606 whether the mode has switched to the normal mode or the non-normal mode, or no mode switching has occurred. In this embodiment, it is determined whether switching to the normal mode has occurred. Upon determining that the mode has switched to the normal mode, the process advances to step S608. If switching to the normal mode has not occurred, that is, when the mode has switched to the non-normal mode (non-display mode), or no mode switching has occurred, the process advances to step S610. Note that the determination based on the mode switching event is not particularly limited. For example, switching of the full screen can be detected by receiving a resolution change message. User switching can be detected by receiving a message notified at the time of logout/login.

Figure 9:
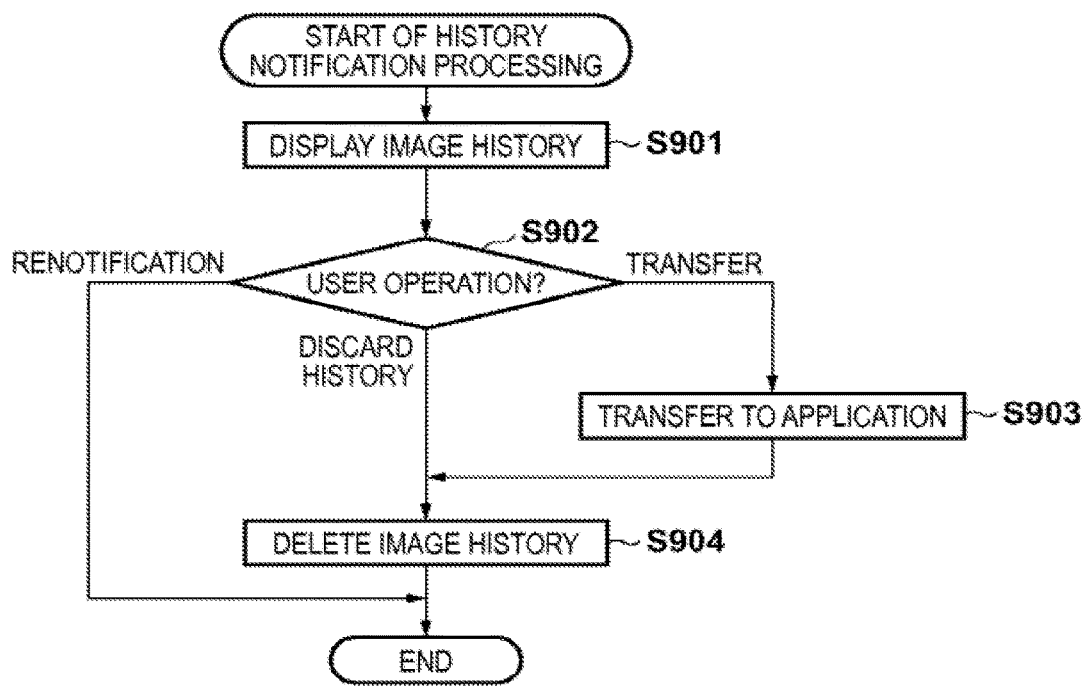
FIG. 9 is a flowchart showing the procedure of processing of step S609 in FIG. 6.

In step S608, it is determined whether an image history is stored in the memory 304. For example, when "notify by mail" is selected by the setting UI 402 in FIG. 4, step S807 in FIG. 8 is not executed, and therefore, no image history is stored. When no reading processing is executed in the non-display mode as well, step S605 in FIG. 6 is not executed, and therefore, no image history is stored. Upon determining in step S608 that no image history is stored, the process advances to step S610. On the other hand, upon determining that an image history is stored, the process advances to step S609. In step S609, history notification processing is performed. FIG. 9 is a flowchart showing the procedure of history notification processing of step S609. Processing shown in FIG. 9 will be described below concerning a case where "notify by notification application when switching to normal mode" is selected by the setting UI 402 in FIG. 4. Note that when "notify by notification function of OS when switching to normal mode" is selected, the wording of a user notification is created, a tool help of TTS BALLOON style is created, and display processing is performed as in the following explanation.

Figure 11:
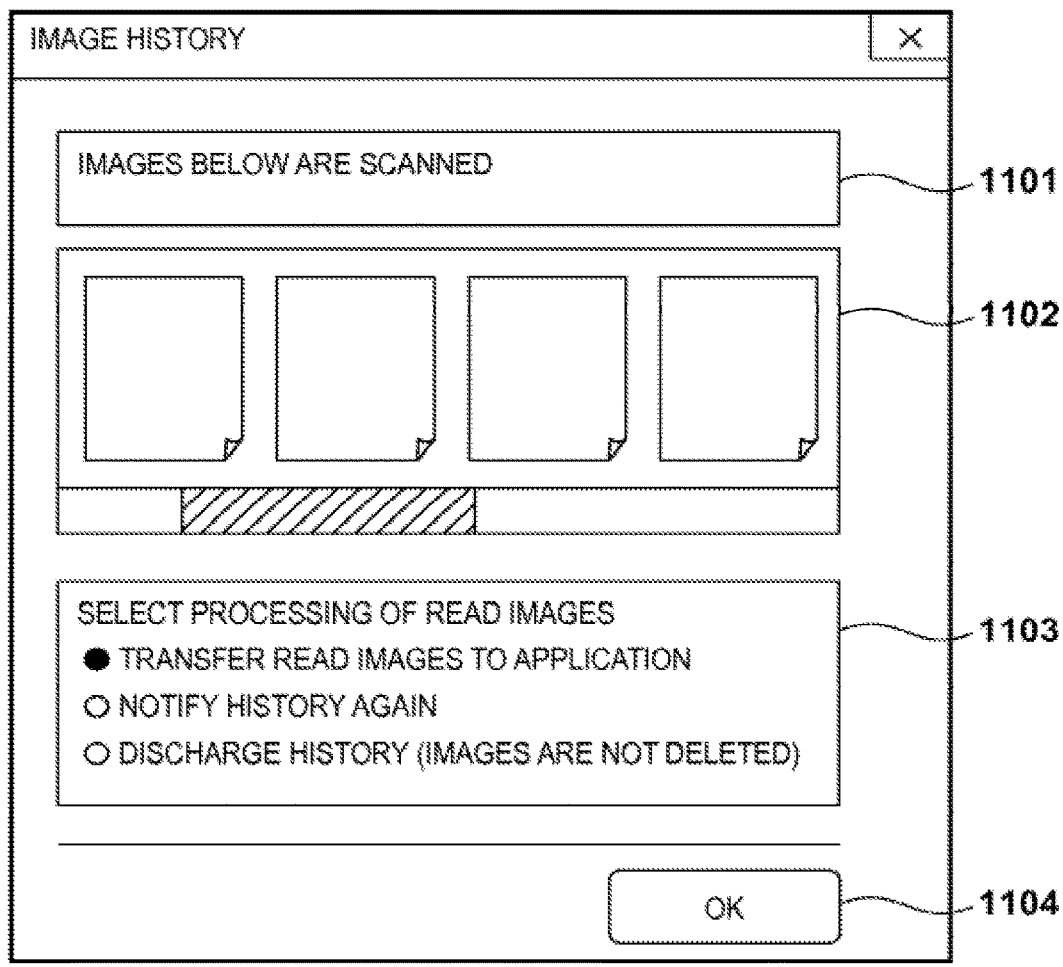
FIG. 11 is a view showing a notification screen.

First in step S901, the image history is displayed on the display unit 305 of the information processing apparatus 300. The image history display method is not particularly limited. For example, a notification screen as shown in FIG. 11 is displayed on the display unit 305. The image history display screen shown in FIG. 11 includes displays 1101, 1102, and 1103, and an OK button 1104. The display 1101 in FIG. 11 shows a mention of the result of image reading processing. The display 1102 shows the thumbnails of image data acquired by reading images. Although the thumbnails are displayed here, the present invention is not limited to this, and the URL information received in step S604 may be displayed. The setting item 1103 shows setting items about the application purpose of image data. For example, the user can select one of "transfer images to application", "notify history again", and "discard history". The selected set contents are confirmed by pressing the OK button 1104.

In step S902 of FIG. 9, which item of the setting item 1103 is selected is determined. When "transfer images to application" is selected, the process advances to step S903. When "notify history again" is selected, the processing of FIG. 9 ends. This aims at immediately returning to the non-display mode if the mode is switched to the normal mode by carelessness or the operation of another application during the user's work in the non-display mode. When "discard history" is selected, the process advances to step S904.

In step S903, the image data is downloaded from the storage server 100 to the information processing apparatus 300 using the URL information received in step S604 of FIG. 6 and transferred to a cooperative application. After that, the processing of FIG. 9 ends. On the other hand, in step S904, the image history stored in the memory 304 is deleted, and the processing of FIG. 9 ends.

Referring back to FIG. 6, the process returns to step S601 after the processing of step S609 in FIG. 6. In step S610, it is determined whether to end the processing. More specifically, it is determined whether the end of the processing of FIG. 6 is instructed by a user operation or the like. Upon determining that the end is instructed, the processing of FIG. 6 ends. On the other hand, upon determining that the end is not instructed, the process returns to step S601 to repeat the processing.

As described above, in this embodiment, the image reading apparatus 200 is assumed to have the scanner function. However, the operation of this embodiment can be implemented even by an arrangement that connects the information processing apparatus to a digital camera, a digital video camera, or an external storage memory such as a USB memory.

As described above, in reading processing in which the information processing apparatus transfers, to a cooperative application, image data generated by causing the image reading apparatus to read an image, the reading processing result notification and the error notification are limited in a predetermined non-display mode. That is, error display or image data transfer to the cooperative application by the information processing apparatus is limited. Notification processing to the user is performed at the timing of switching to a mode other than the non-display mode. It is therefore possible to prevent user's working efficiency from lowering in the non-display mode.

Second Embodiment

This embodiment is different from the first embodiment in that an information processing apparatus 300 performs reading control of an image reading apparatus 200.

Figure 12:
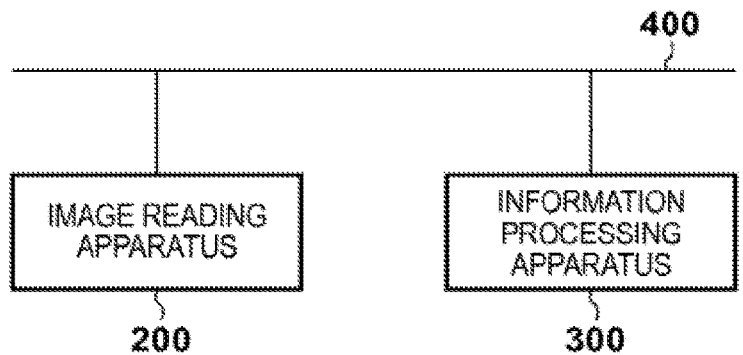
FIG. 12 is a block diagram showing another arrangement of the image reading system.

FIG. 12 is a block diagram showing a system configuration according to this embodiment. Referring to FIG. 12, no storage server 100 is connected to a network 400, unlike FIG. 1. The information processing apparatus 300 can receive image data held by the image reading apparatus 200 by transmitting a reading control command to the image reading apparatus 200. The arrangements of the image reading apparatus 200 and the information processing apparatus 300 are the same as in the first embodiment, and a description thereof will be omitted.

In this embodiment as well, the user sets setting items for the non-display mode on a setting screen shown in FIG. 4 before reading processing, as in the first embodiment. In this embodiment, a case where the setting screen shown in FIG. 4 is displayed on a display unit 305 of the information processing apparatus 300 will be described.

Figure 13:
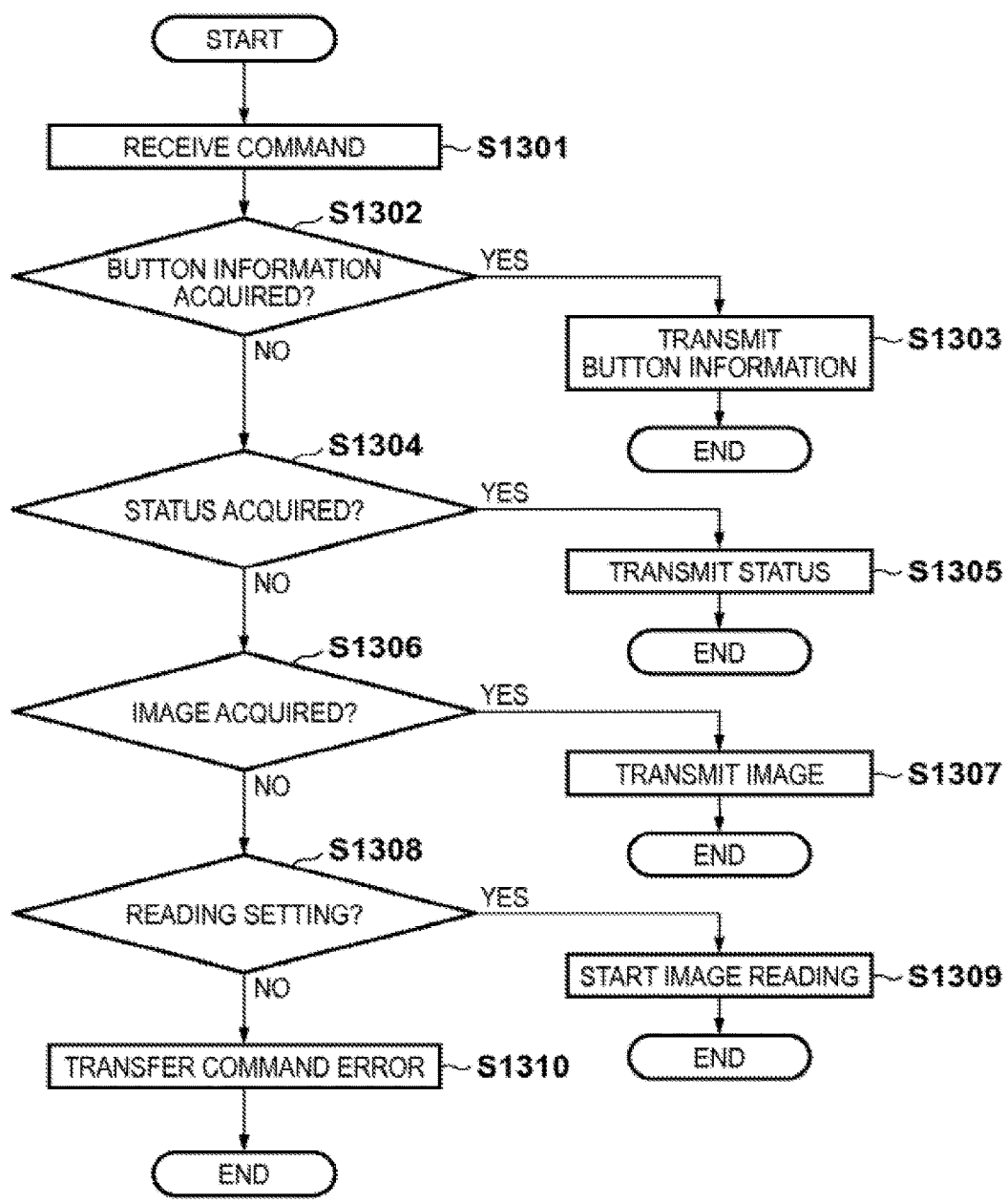
FIG. 13 is a flowchart showing the procedure of reading control processing of the image reading apparatus.

FIG. 13 is a flowchart showing the procedure of processing of the image reading apparatus 200 according to this embodiment. The processing of FIG. 13 is implemented by, for example, a CPU 205 of the image reading apparatus 200. This embodiment is more effective when a sufficient memory area for image reading is not formed in the image reading apparatus 200. In this case, reading processing is implemented in accordance with a reading control command transmitted from the information processing apparatus 300 to the image reading apparatus 200.

First in step S1301, a command is received from the information processing apparatus 300. In step S1302, it is determined whether the command received in step S1301 is a button information acquisition request command. Upon determining that the command is a button information acquisition request command, the process advances to step S1303. Upon determining that the command is not a button information acquisition request command, the process advances to step S1304.

In step S1303, button information is transmitted to the information processing apparatus 300, and the processing shown in FIG. 13 ends. The button information is information about a button that the user has operated by an operation unit 209 of the image reading apparatus 200. If the button information acquisition request command is received in step S1301 in a state in which the operation unit 209 is not operated, information representing that no button is pressed is transmitted in step S1303.

In step S1304, it is determined whether the command received in step S1301 is a status acquisition request command. Upon determining that the command is a status acquisition request command, the process advances to step S1305. Upon determining that the command is not a status acquisition request command, the process advances to step S1306.

In step S1305, status information of the image reading apparatus 200 is transmitted to the information processing apparatus 300, and the processing shown in FIG. 13 ends. The status information represents the idle state of the image reading apparatus 200, image reading, image reading completion, error occurrence, or the like.

In step S1306, it is determined whether the command received in step S1301 is an image acquisition request command. Upon determining that the command is an image acquisition request command, the process advances to step S1307. Upon determining that the command is not an image acquisition request command, the process advances to step S1308.

In step S1307, image data acquired by reading is transmitted to the information processing apparatus 300, and the processing shown in FIG. 13 ends. The image data is image data acquired by reading an image and stored in a work memory 207. If image reading is not performed, or if the work memory 207 is empty although image reading is performed, the processing shown in FIG. 13 ends without transmitting image data in step S1307.

In step S1308, it is determined whether the command received in step S1301 is a reading setting command. Upon determining that the command is a reading setting command, the process advances to step S1309. Upon determining that the command is not a reading setting command, the process advances to step S1310.

In step S1309, image reading processing is performed based on the reading setting described in the command transmitted from the information processing apparatus 300, and the image data acquired by reading is stored in the work memory 207. Note that the reading processing is performed independently of the processing of FIG. 13, and image data write in the work memory 207 is continued until completion of the reading processing. If an error has occurred halfway through the reading processing, the reading processing ends.

In step S1310, the command received in step S1301 is determined as an unknown command that cannot be processed by the image reading apparatus 200, error information representing the unprocessability is transmitted to the information processing apparatus 300, and the processing of FIG. 13 ends.

Figure 14:
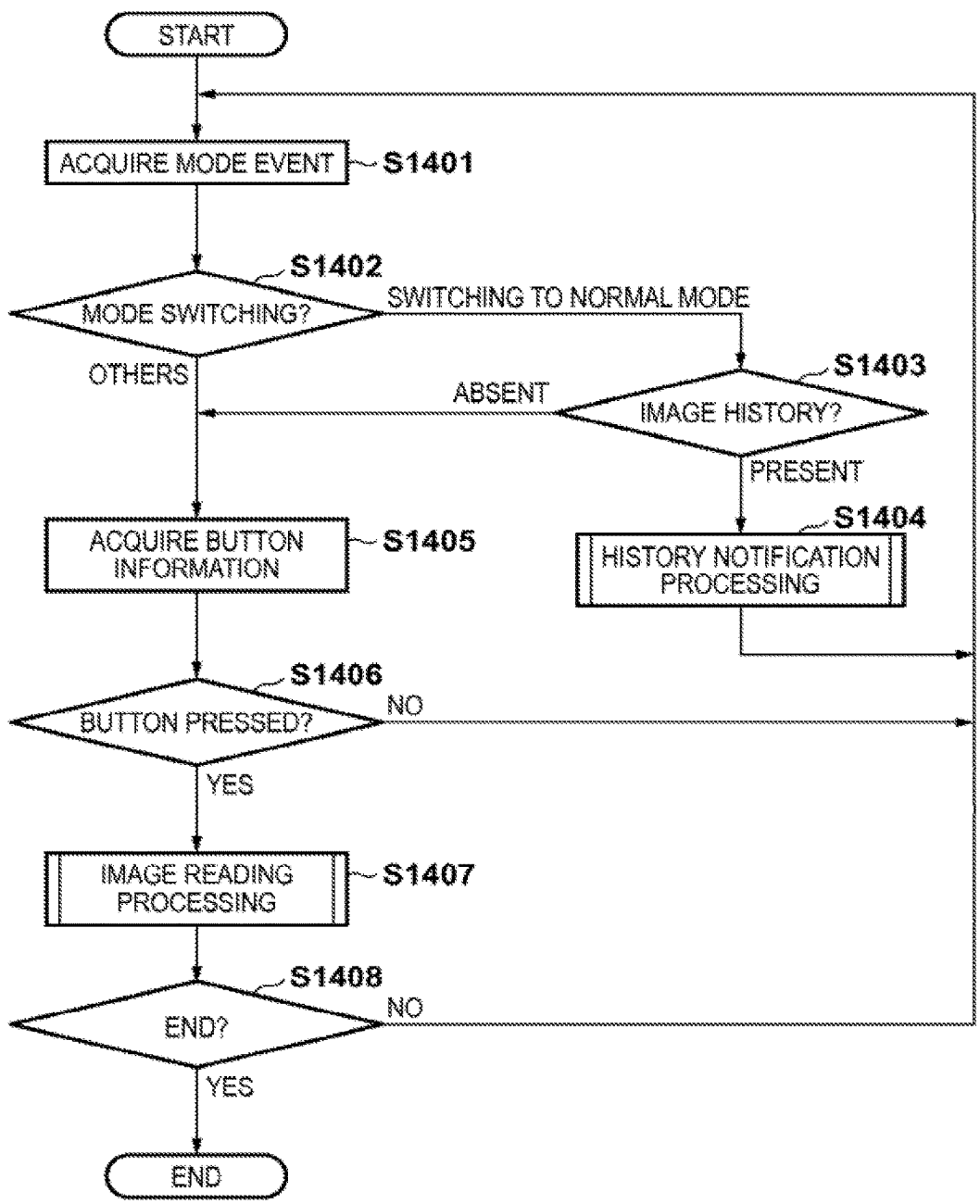
FIG. 14 is a flowchart showing the procedure of reading control processing of the information processing apparatus.

FIG. 14 is a flowchart showing the procedure of processing of reading control of the image reading apparatus 200 from the information processing apparatus 300. The processing of FIG. 14 is implemented by, for example, a CPU 301 of the information processing apparatus 300. Processes of steps S1401 to S1404 are the same as those of steps S606 to S609 of FIG. 6, and a description thereof will be omitted.

Upon determining in step S1402 that the mode has switched to the non-normal mode (non-display mode), or no mode switching has occurred, a button information acquisition request command is transmitted to the image reading apparatus 200 in step S1405.

In step S1406, it is determined whether the operation unit 209 of the image reading apparatus 200 is operated. If no button information can be acquired in step S1405, it is determined that the operation unit 209 of the image reading apparatus 200 is not operated, and the processing is repeated from step S1401. On the other hand, if button information can be acquired in step S1405, it is determined that the operation unit 209 of the image reading apparatus 200 is operated, and image reading processing is executed in step S1407.

In this embodiment, if the mode has switched to the non-display mode, or no mode switching has occurred in the information processing apparatus 300, acquisition of the button information of the image reading apparatus 200 is repeated, as shown in FIG. 14.

Figure 15:
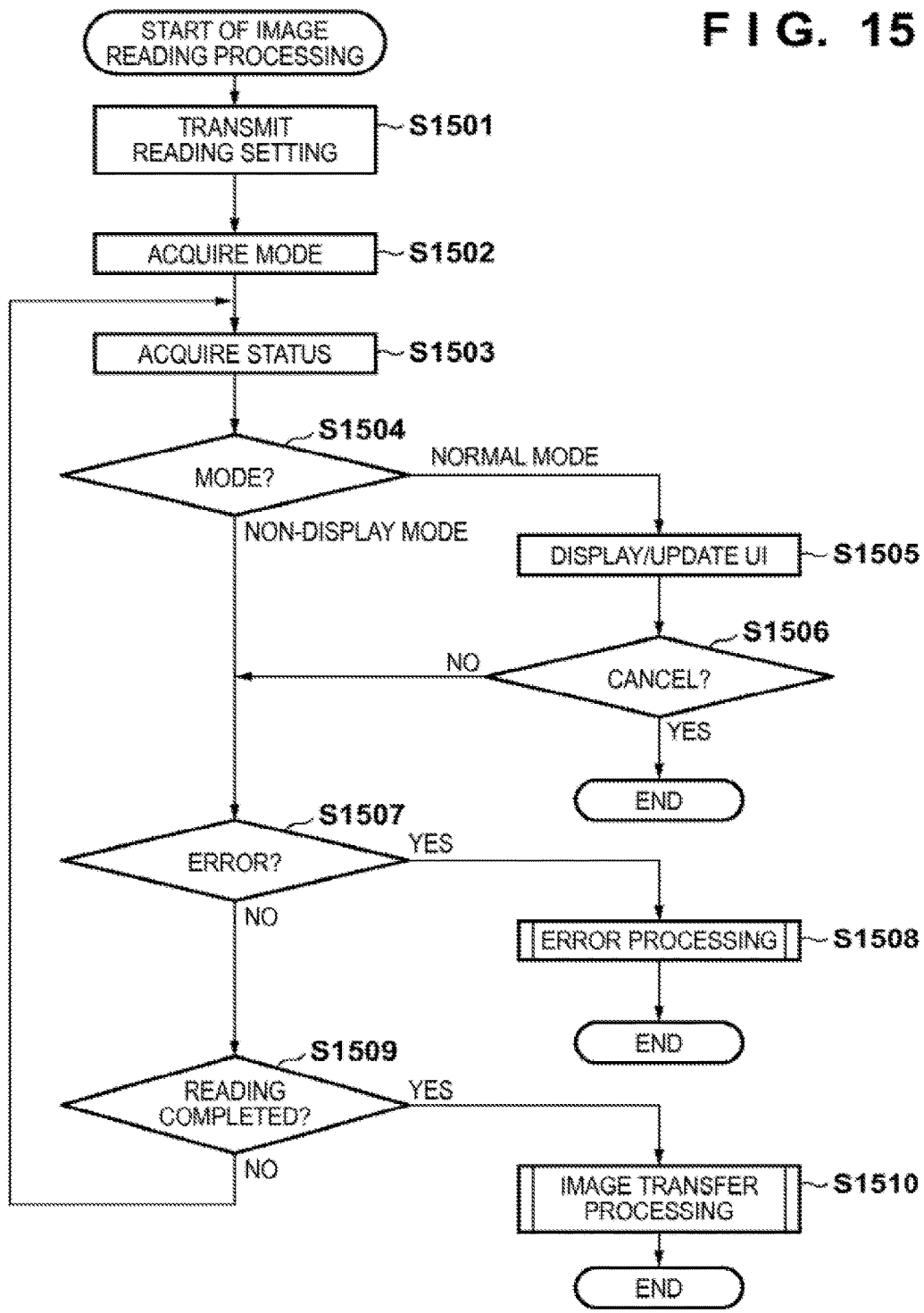
FIG. 15 is a flowchart showing the procedure of processing of step S1407 in FIG. 14.

FIG. 15 is a flowchart showing the procedure of image reading processing of step S1407 in FIG. 14. In step S1501, a reading setting command is transmitted to the image reading apparatus 200. The reading setting command includes a reading range, resolution, and color mode setting to be used by the image reading apparatus 200 to do reading processing. These reading settings are preset by the user using an operation unit 306 of the information processing apparatus 300. When the reading setting command is transmitted in step S1501, the image reading apparatus 200 performs processing of step S1309 of FIG. 13.

In step S1502, the current mode of the information processing apparatus 300 is acquired as in step S701 of FIG. 7. In step S1503, a request command of the status information of the image reading apparatus 200 is transmitted to the image reading apparatus 200, and the status information request of the image reading apparatus 200 is received. When the status information request command is transmitted in step S1503, the image reading apparatus 200 performs processing of step S1305 of FIG. 13.

In step S1504, it is determined whether the current mode of the information processing apparatus 300 acquired in step S1502 is the non-display mode or the normal mode. More specifically, it is determined whether at least one of a plurality of determined modes is the non-display mode, or none of all acquired modes is the non-display mode (that is, all modes are the normal modes). Upon determining that at least one mode is the non-display mode, the process advances to step S1507. Upon determining that all acquired modes are the normal modes, the process advances to step S1505.

In this embodiment, the current mode of the information processing apparatus 300 is acquired before reading processing only once in step S1502. If the mode switches to the non-display mode during image reading of the image reading apparatus 200, mode acquisition processing is performed in step S1508 or S1510. If the load of mode acquisition processing is low, and no problem is posed in the processing of the information processing apparatus 300, the mode acquisition processing may be executed at a timing other than step S1502, for example, after the processing of step S1503.

Figure 16:
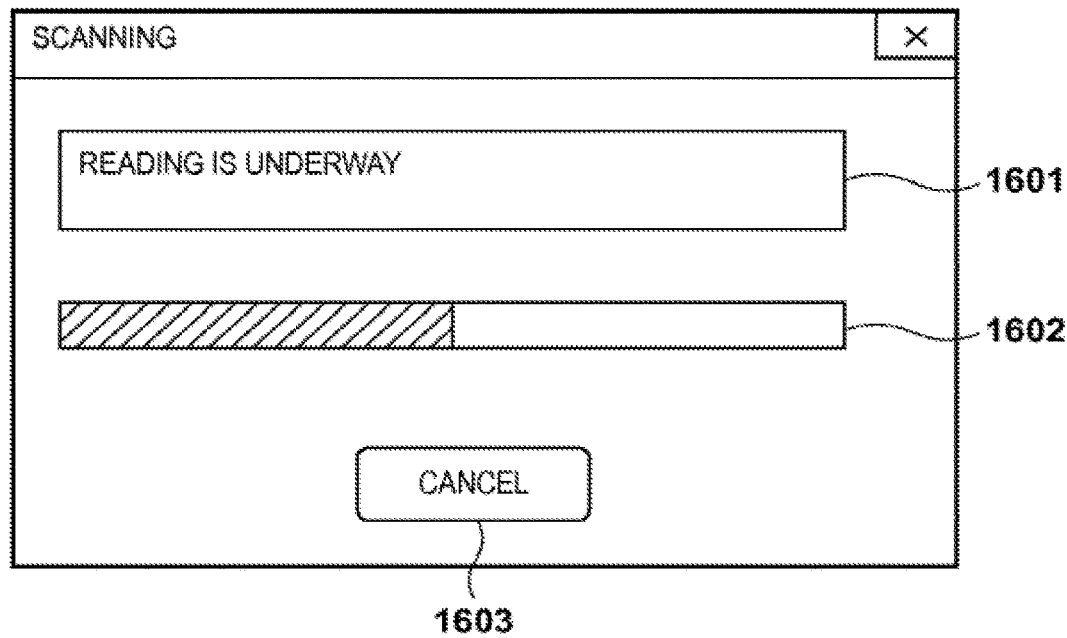
FIG. 16 is a view showing a screen indicating the progress of image reading.

In step S1505, a user interface screen indicating the progress of image reading, as shown in FIG. 16, is displayed on the display unit 305. As shown in FIG. 16, a display 1601 shows a reading state such as initialization underway or reading underway. A display 1602 shows the progress state of the reading processing by a gauge. When the user presses a cancel button 1603, reading processing is canceled.

In step S1506, it is determined whether cancel is instructed. In this embodiment, it is determined whether the cancel button 1603 shown in FIG. 16 is pressed. Upon determining that the cancel button 1603 is pressed, a command to instruct the cancel is transmitted to the image reading apparatus 200, and the processing shown in FIG. 15 ends. Upon determining that the cancel button 1603 is not pressed, the process advances to step S1507.

In step S1507, it is determined whether an error has occurred. More specifically, it is determined whether the status information acquired in step S1503 represents error information. Upon determining that the status information represents error information, the process advances to step S1508. Upon determining that the status information does not represent error information, the process advances to step S1509. In step S1508, the same processing as the error processing shown in FIG. 7 is performed.

In step S1509, it is determined whether the status information acquired in step S1503 represents completion of reading processing. Upon determining that the status information represents completion of reading processing, the process advances to step S1510. Upon determining that the status information does not represent completion of reading processing, the processing is repeated from step S1503. In step S1510, the same processing as the image transfer processing shown in FIG. 8 is performed. In this embodiment, however, image data is downloaded from the image reading apparatus 200 in step S803 of FIG. 8. At the time of download, the information processing apparatus 300 transmits an image data acquisition request command to the image reading apparatus 200. URL information stored as an image history in step S807 of FIG. 8 is information representing the image data storage location in the image reading apparatus 200.

Referring back to FIG. 14, after the processing of step S1407, it is determined in step S1408 whether to end the processing. More specifically, it is determined whether the end of the processing of FIG. 14 is instructed by a user operation or the like. Upon determining that the end is instructed, the processing of FIG. 14 ends. On the other hand, upon determining that the end is not instructed, the processing is repeated from step S1401.

Other Embodiments

The basic arrangement of the present invention is not limited to that described above. The above-described embodiments are means for obtaining the effects of the present invention. If the same effects as in the present invention can be obtained using anther similar method or different parameters, the arrangement is incorporated in the present invention.

In the above-described embodiments, the result of reading processing of the image reading apparatus has been exemplified. However, the information to be displayed on the display unit when a predetermined condition holds is not limited to this, and need only be different from the contents already displayed on the display unit. As the information to be displayed on the display unit when a predetermined condition holds, for example, a print processing result received from an apparatus connected to the information processing apparatus via a network or the like is usable.

In the above embodiments according to the present invention, lowering of a user working efficiency can be prevented in an information processing apparatus having a plurality of display modes.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193487, filed Sep. 18, 2013, which is hereby incorporated by reference herein in its entirety.

What is claimed is:

1. An apparatus which is able to perform a single area mode in which a single display area occupies a screen and a multi-area mode in which a plurality of display areas share the screen, the apparatus comprising:
   at least one processor operating to:
   cause a display unit to display a predetermined notification indicating an error state; and
   change a state of the predetermined notification in response to a user operation on a specified button provided in an external apparatus,
   wherein the specified button is set to be able to change, in response to the user operation on the specified button, the state from a non-display state in which the predetermined notification is not displayed even in the error state, to a display state in which the predetermined notification is displayed in the error state, and
   wherein, in a case where the state is changed from the non-display state to the display state in response to the user operation on the specified button while the single area mode in which a display target is displayed in the single display area is being performed, the predetermined notification is displayed within the single display area in which the display target is being displayed.

2. The apparatus according to claim 1, wherein the at least one processor further operates to cause the display unit to display a setting window, and
   wherein based on a user instruction via the setting window, the specified button is set to be able to change the state from the non-display state to the display state in response to the user operation on the specified button.

3. The apparatus according to claim 2, wherein a candidate which is able to change the state from the non-display state to the display state, except for the specified button, is displayed in the setting window.

4. The apparatus according to claim 1, wherein the apparatus is further able to perform a mode in which a specified notification different from the predetermined notification is able to be displayed even in the non-display state.

5. The apparatus according to claim 1, wherein the apparatus is further able to perform a mode in which all notifications including the predetermined notification are not displayed in the non-display state.

6. The apparatus according to claim 1, wherein a specified function is also limited in the non-display state.

7. The apparatus according to claim 1, wherein the predetermined notification is able to be notified outside of the apparatus.

8. The apparatus according to claim 1, wherein the predetermined notification is not displayed in a case where only a button different from the specified button is pressed in the non-display state.

9. The apparatus according to claim 1, wherein the predetermined notification is a notification regarding a transfer of image data.

10. The apparatus according to claim 1, wherein the predetermined notification is a notification regarding a memory.

11. The apparatus according to claim 1, wherein the apparatus is an apparatus for obtaining image data.

12. An apparatus which is able to perform a single area mode in which a single display area occupies a screen and a multi-area mode in which a plurality of display areas share the screen, the apparatus comprising:
at least one processor operating to:
cause a display unit to display a predetermined notification indicating a predetermined state which is required to be solved by a user; and
change a state of the predetermined notification in response to a user operation on a specified button provided in an external apparatus,
wherein the specified button is set to be able to change, in response to the user operation on the specified button, the state from a non-display state in which the predetermined notification is not displayed even in the predetermined state, to a display state in which the predetermined notification is displayed in the predetermined state, and
wherein, in a case where the state is changed from the non-display state to the display state in response to the user operation on the specified button while the single area mode that a display target is displayed in the single display area is being performed, the predetermined notification is displayed within the single display area in which the display target is being displayed.

13. The apparatus according to claim 12, wherein the at least one processor further operates to cause the display unit to display a setting window, and
wherein based on a user instruction via the setting window, the specified button is set to be able to change the state from the non-display state to the display state in response to the user operation on the specified button.

14. The apparatus according to claim 13, wherein a candidate which is able to change the state from the non-display state to the display state, except for the specified button, is displayed in the setting window.

15. The apparatus according to claim 12, wherein the apparatus is further able to perform a mode in which a specified notification different from the predetermined notification is able to be displayed even in the non-display state.

16. The apparatus according to claim 12, wherein the apparatus is further able to perform a mode in which all notifications including the predetermined notification are not displayed in the non-display state.

17. The apparatus according to claim 12, wherein a specified function is also limited in the non-display state.

18. The apparatus according to claim 12, wherein the predetermined notification is able to be notified outside of the apparatus.

19. The apparatus according to claim 12, wherein the predetermined notification is not displayed in a case where only a button different from the specified button is pressed in the non-display state.

20. The apparatus according to claim 12, wherein the predetermined notification is a notification regarding a transfer of image data.

21. The apparatus according to claim 12, wherein the predetermined notification is a notification regarding a memory.

22. The apparatus according to claim 12, wherein the apparatus is an apparatus for obtaining image data.

23. An apparatus which is able to perform a single area mode in which a single display area occupies a screen and a multi-area mode in which a plurality of display areas share the screen, the apparatus comprising:
at least one processor operating to:
cause a display unit to display a predetermined notification indicating a predetermined state;
cause the display unit to display a setting window;
perform setting regarding a display of the predetermined notification based on a user instruction via the setting window; and
change a state of the predetermined notification in response to a user operation on specified button provided in an external apparatus,
wherein the specified button is set to be able to change, in response to the user operation on the specified button only, the state from a non-display state in which the predetermined notification is not displayed even in the predetermined state, to a display state in which the predetermined notification is displayed in the predetermined state, and
wherein, in a case where the state is changed from the non-display state to the display state in response to the user operation on the specified button while the single area mode is being performed, the predetermined notification is displayed within the single display area.

24. The apparatus according to claim 23, wherein a candidate which is able to change the state from the non-display state to the display state, except for the specified button, is displayed in the setting window.

25. The apparatus according to claim 23, wherein the apparatus is further able to perform a mode in which a specified notification different from the predetermined notification is able to be displayed even in the non-display state.

26. The apparatus according to claim 23, wherein the apparatus is further able to perform a mode in which all notifications including the predetermined notification are not displayed in the non-display state.

27. The apparatus according to claim 23, wherein a specified function is also limited in the non-display state.

28. The apparatus according to claim 23, wherein the predetermined notification is able to be notified outside of the apparatus.

29. The apparatus according to claim 23, wherein the predetermined notification is not displayed in a case where only a button different from the specified button is pressed in the non-display state.

30. The apparatus according to claim 23, wherein the predetermined notification is a notification regarding a transfer of image data.

31. The apparatus according to claim 23, wherein the predetermined notification is a notification regarding a memory.

32. The apparatus according to claim 23, wherein the apparatus is an apparatus for obtaining image data.

* * * * *